(12) United States Patent
Moon et al.

(10) Patent No.: US 7,444,066 B2
(45) Date of Patent: *Oct. 28, 2008

(54) RECORDING MEDIUM FOR STORING INFORMATION FOR STILL PICTURE, RECORDING AND/OR REPRODUCING METHOD AND APPARATUS THEREFOR

(75) Inventors: Seong-jin Moon, Suwon (KR); Young-nam Oh, Sungnam (KR); Tae-yun Chung, Gwacheon (KR); Jung-suk Kang, Seoul (KR); Pan-gie Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 951 days.

This patent is subject to a terminal disclaimer.

(21) Appl. No.: 10/712,320

(22) Filed: Nov. 14, 2003

(65) Prior Publication Data

US 2004/0095479 A1    May 20, 2004

Related U.S. Application Data

(60) Continuation of application No. 09/598,905, filed on Jun. 22, 2000, now Pat. No. 6,674,957, which is a division of application No. 09/339,192, filed on Jun. 24, 1999, now Pat. No. 6,757,480.

(30) Foreign Application Priority Data

Jun. 24, 1998  (KR) .................................. 98-23993
Oct. 2, 1998   (KR) .................................. 98-41758

(51) Int. Cl.
   *H04N 7/00*   (2006.01)
   *H04N 9/00*   (2006.01)
   *H04N 9/79*   (2006.01)
   *H04N 5/00*   (2006.01)
   *H04N 5/76*   (2006.01)
   *G06F 17/00*  (2006.01)
   *G06F 17/30*  (2006.01)

(52) U.S. Cl. .............................. 386/96; 386/39; 386/45; 386/95; 386/125; 386/126; 348/231.2; 348/231.3; 707/100; 707/104.1; 707/200

(58) Field of Classification Search ................... 386/96, 386/126, 125, 39, 45, 95; 345/475; 715/500.1; 348/231.2, 231.3; 707/100, 104.1, 200
See application file for complete search history.

(56) References Cited

U.S. PATENT DOCUMENTS

| | | | |
|---|---|---|---|
| 5,555,098 A | 9/1996 | Parulski | |
| 5,781,689 A | 7/1998 | Horii | |
| 5,806,072 A * | 9/1998 | Kuba et al. | ................. 707/200 |
| 5,895,123 A | 4/1999 | Fujii et al. | |
| 5,933,570 A | 8/1999 | Fujita | |
| 5,956,460 A | 9/1999 | Yamagata et al. | |
| 5,999,697 A | 12/1999 | Murase et al. | |
| 6,084,630 A | 7/2000 | Yamagishi et al. | |
| 6,249,641 B1 | 6/2001 | Yokota | |
| 6,301,431 B1 | 10/2001 | Yamagata et al. | |
| 6,594,442 B1 * | 7/2003 | Kageyama et al. | ............ 386/96 |

FOREIGN PATENT DOCUMENTS

| | | |
|---|---|---|
| CN | 1239303 | 12/1999 |
| EP | 0295148 | 12/1988 |
| EP | 0 689 206 A1 | 12/1994 |
| EP | 0 730 272 A2 | 9/1996 |
| EP | 0753854 | 1/1997 |
| EP | 0755162 | 1/1997 |
| EP | 0965991 A1 | 12/1999 |
| JP | 5-115054 | 5/1993 |
| JP | 5-325500 | 12/1993 |
| JP | 9-146918 | 6/1997 |
| JP | 9-238303 | 9/1997 |
| JP | 2000-3561 | 1/2000 |

OTHER PUBLICATIONS

U.S. Appl. No. 09/598,902, filed Jun. 22, 2000, Moon et al. Samsung Electronics Co., LTD.

Japanese Office Action for Japanese Divisional Patent Application No. 2000-321766, dated Jul. 13, 2004 (related to the present application).

European Search Report, dated Aug. 2, 2004, for related European Patent Divisional Application No. 03000616.

U.S. Appl. No. 10/705,875, filed Nov. 13, 2003, Seong-jin Moon, et al. Samsung Electronics Co., LTD.

U.S. Appl. No. 10/704,716, filed Nov. 12, 2003, Seong-jin Moon, et al. Samsung Electronics Co., LTD.

\* cited by examiner

*Primary Examiner*—Thai Tran
*Assistant Examiner*—Syed Y Hasan
(74) *Attorney, Agent, or Firm*—Stein, McEwen & Bui, LLP

(57) ABSTRACT

A recording medium for storing information for still pictures, and a recording and/or reproducing method and apparatus therefor. A writeable and rewriteable recording medium stores data for a plurality of still pictures and audio data added thereto in one file or a space having a logically one-dimensional order, rather than in each file, and still picture group information for separating the still picture data into within a predetermined maximum number of groups in order to manage the still pictures at a group level is then stored on the recording medium. Thus, large-capacity still picture data and audio data added thereto can be recorded and/or reproduced using a minimum amount of information. The still picture group information includes general information for still picture groups, and information for still pictures in each still picture group. The general information for each still picture group includes the start position of a first still picture in each still picture group (the start position of each still picture group). The information for still pictures in each still picture group includes the sizes of video data and audio data for each still picture. Therefore, effective management of information is allowed.

7 Claims, 12 Drawing Sheets

|  | Contents | Number of Bytes |
|---|---|---|
|  | Reserved | 2 bytes |
| GVOB_ID | VOB Group ID | 2 bytes |
| GVOB_S_ADR | Start address of VOB Group | 4 bytes |
| GVOB_Ns | Number of Video Parts | 1 byte |

| | Contents | Number of Bytes |
|---|---|---|
| MAP_TY | Map type | 1 bit |
| VOB_ID | VOB ID | 7 bits |
| V_PART_SZ | Size of Video part. | 1 byte |

| | Contents | Number of Bytes |
|---|---|---|
| MAP_TY | Map type | 1 bit |
| | Reserved | 7 bits |
| A_PBTM | Playback Time of Audio | 2 bytes |
| A_PART SZ | Size of Audio part | 2 bytes |

FIG. 12

|  | Contents | Number of Bytes |
|---|---|---|
| S_GVOB_ID | VOB Group ID for Still Picture | 2 bytes |
| S_VOB_ID | VOB ID for Start Still Picture | 1 byte |
| E_VOB_ID | VOB ID for END Still Picture | 1 byte |
|  | Reserved | 5 bytes |

RECORDING MEDIUM FOR STORING INFORMATION FOR STILL PICTURE, RECORDING AND/OR REPRODUCING METHOD AND APPARATUS THEREFOR

CROSS-REFERENCE TO RELATED APPLICATIONS

This application is a continuation of application Ser. No. 09/598,905, filed Jun. 22, 2000 now U.S. Pat. No. 6,674,957, which is a divisional of application Ser. No. 09/339,192, filed Jun. 24, 1999 now U.S. Pat. No. 6,757,480, which claims the benefit of Korean Application Nos. 98-23993, filed Jun. 24, 1998 and 98-41758, filed Oct. 2, 1998, in the Korean Patent Office, the disclosures of which are incorporated herein by reference.

BACKGROUND OF THE INVENTION

1. Field of the Invention

The present invention relates to recording and/or reproducing audio and/or video data using a rewriteable recording medium, and more particularly, to a recording medium for storing still pictures and audio data added thereto for effective processing, and a recording and/or reproducing method and apparatus therefor.

2. Description of the Related Art

FIG. 1 shows a connection structure for various kinds of information in a moving picture and moving picture data, in recording/reproducing audio and/or video data on a recordable and/or rewriteable recording medium, specifically, a digital versatile disk (DVD), and more precisely, it illustrates the relationship between program chain (PGC) information 11 for treating data logically, moving picture information 12 consisting of video object (VOB) information, and a moving picture data file 13 in which actually compressed audio/video (A/V) data are recorded in VOB units.

First, terms used throughout the specification will now be described. Supposing a movie was recorded in first and second parts, the overall movie is a program chain (PGC) and the first and second parts are programs. Also, each program can be defined by further dividing the same into several cells called sub-units. The information in each cell can wholly or partially define a video object (VOB). In such an event, each cell is used as a basic accessing unit during reproduction, and the program and PGC are only the information for connectivity between a plurality of cells.

Also, since data is actually sub-divided into video object units (VOBUs) and recorded in a moving picture data file, the VOB information consists of various kinds of information relating to the VOBU data, that is, VOBU #1, VOBU #2, . . . and the VOB data in the moving picture data file 13 is accessed by the VOB information. Here, the VOB data is used as a random access unit of a disk recording/reproducing apparatus. The VOBU is based on a single GOP (Group of Pictures) in the case of an MPEG (Moving Picture Experts Group) video, and audio data corresponding to video data is collected, that is, A/V data is multiplexed into sectors, to constitute a VOBU.

The data format shown in FIG. 1 is concerned with the moving picture, in which the unit of actual data, the VOB, comprises moving picture data for a fixed period of time. Synchronization or encoding of A/V signals is performed in units of VOBs. However, in the case of a still picture, each VOB constitutes a still picture. When a VOB is designated in a cell structure, a cell is necessary for each still picture. Thus, as more still pictures are recorded, more information is added.

Generally, data errors may be generated if data is recorded on a recordable disk a predetermined number of times. Thus, there is a limit in the number of times of rewriting data on a disk. All information is stored in the memory of a controller for controlling the system for the purpose of limiting the number of recording times and rapidly accessing data. However, as described above, in the case of a still picture, if the amount of information is increased, much time is required for reading the information. Also, there is a limit to the amount of information that can be stored in a memory with a limited size. Accordingly, it is not possible to record large-capacity still pictures.

SUMMARY OF THE INVENTION

To solve the above problems, it is a first object of the present invention to provide a recording medium for effectively storing still picture group information for separating large-capacity still pictures into a plurality of groups in order to manage the still pictures at a group level.

It is a second object of the present invention to provide a recording medium for generating still picture group information containing video information for a still picture or video information for a still picture having audio data added thereto, and audio data, in the recording order of recorded bitstreams and storing the same.

It is a third object of the present invention to provide a method for recording still picture group information for separating large-capacity still pictures into a plurality of groups in order to manage the still pictures at a group level, and cell information related to reproduction, and for reproducing a still picture according to the recorded information.

It is a fourth object of the present invention to provide a method for recording still picture group information containing video information for a still picture or video information for a still picture having audio data added thereto, and cell information related to reproduction, and for reproducing the still picture or the still picture having audio data added thereto according to the recorded information.

It is a fifth object of the present invention to provide an apparatus for recording still picture group information for separating large-capacity still pictures and audio data added thereto into a plurality of groups in order to manage the still pictures at a group level, and reproducing the still picture or both the still picture and the audio data added thereto according to the recorded information.

Additional objects and advantages of the invention will be set forth in part in the description which follows and, in part, will be obvious from the description, or may be learned by practice of the invention.

To achieve these objects, there is provided a recording medium including a first region having data for a plurality of still pictures, and a second region having still picture group information for separating the still picture data in the first region into within a predetermined maximum number of groups in order to manage the still pictures at a group level.

According to the present invention, there is provided a method for recording and/or reproducing audio and/or video data on a writeable and/or rewriteable recording medium including the steps of (a) recording a plurality of input still pictures, and (b) separating the plurality of still pictures into within a predetermined maximum number of groups, and recording still picture group information and playback information related to reproduction thereof.

Also, the method according to the present invention may further include the steps of (c) reading still picture group information to be reproduced in accordance with the playback information, and (d) calculating the position of a desired still picture in accordance with the read still picture group information and reproducing the still picture data located at the calculated position.

According to another aspect of the invention, there is provided a reproduction method of a recording medium comprising a first region having data for a plurality of still pictures, a second region having still picture group information for separating the still picture data in the first region into within a predetermined maximum number of groups in order to manage the still pictures at a group level, the reproduction method comprising the step of reproducing the still picture data in the first region, based on the still picture group information in the second region.

The apparatus according to the present invention includes a recording processor to signal-process a plurality of still pictures to be recorded in a first region on the recording medium, and a controller to generate still picture group information for separating the still pictures in the first region into within a predetermined maximum number of groups in order to manage the still pictures at a group level and playback information related to a reproduction order of the still pictures to be played back, and to control the generated information to be recorded in a second region of the recording medium.

Also, the apparatus may further include a playback processor for reproducing still picture data in the first region based on the still picture group information.

BRIEF DESCRIPTION OF THE DRAWINGS

The above objects and advantages of the present invention will become more apparent by describing in detail a preferred embodiment thereof with reference to the attached drawings, in which:

FIG. 12 is a table showing an example of the detailed contents of cell information for the still picture shown in FIG. 6;

DETAILED DESCRIPTION OF THE PREFERRED EMBODIMENTS

Figure 1:
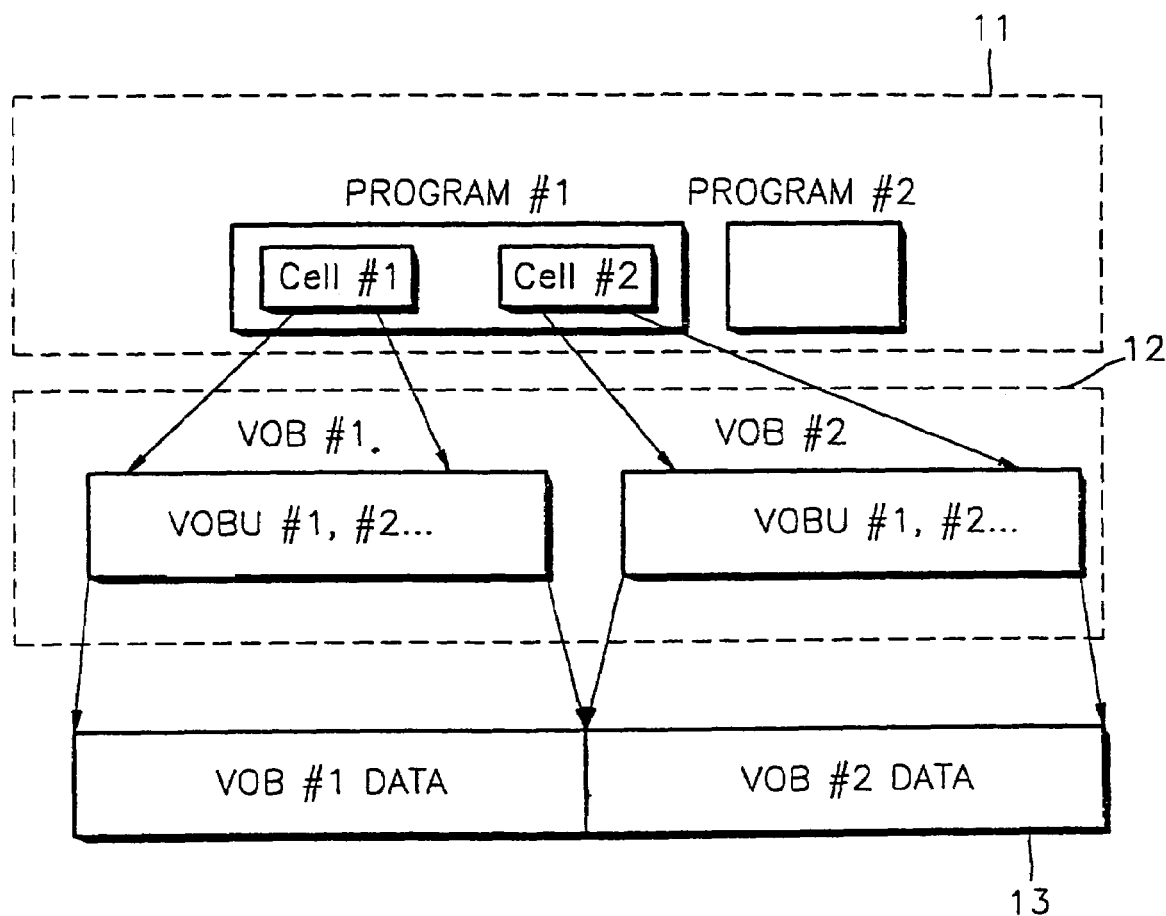
FIG. 1 illustrates a connection structure of various kinds of information and data in a moving picture.

Hereinafter, a preferred embodiment of recording media for storing the information for a still picture, and recording and/or reproducing method and apparatus therefor, will be described.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
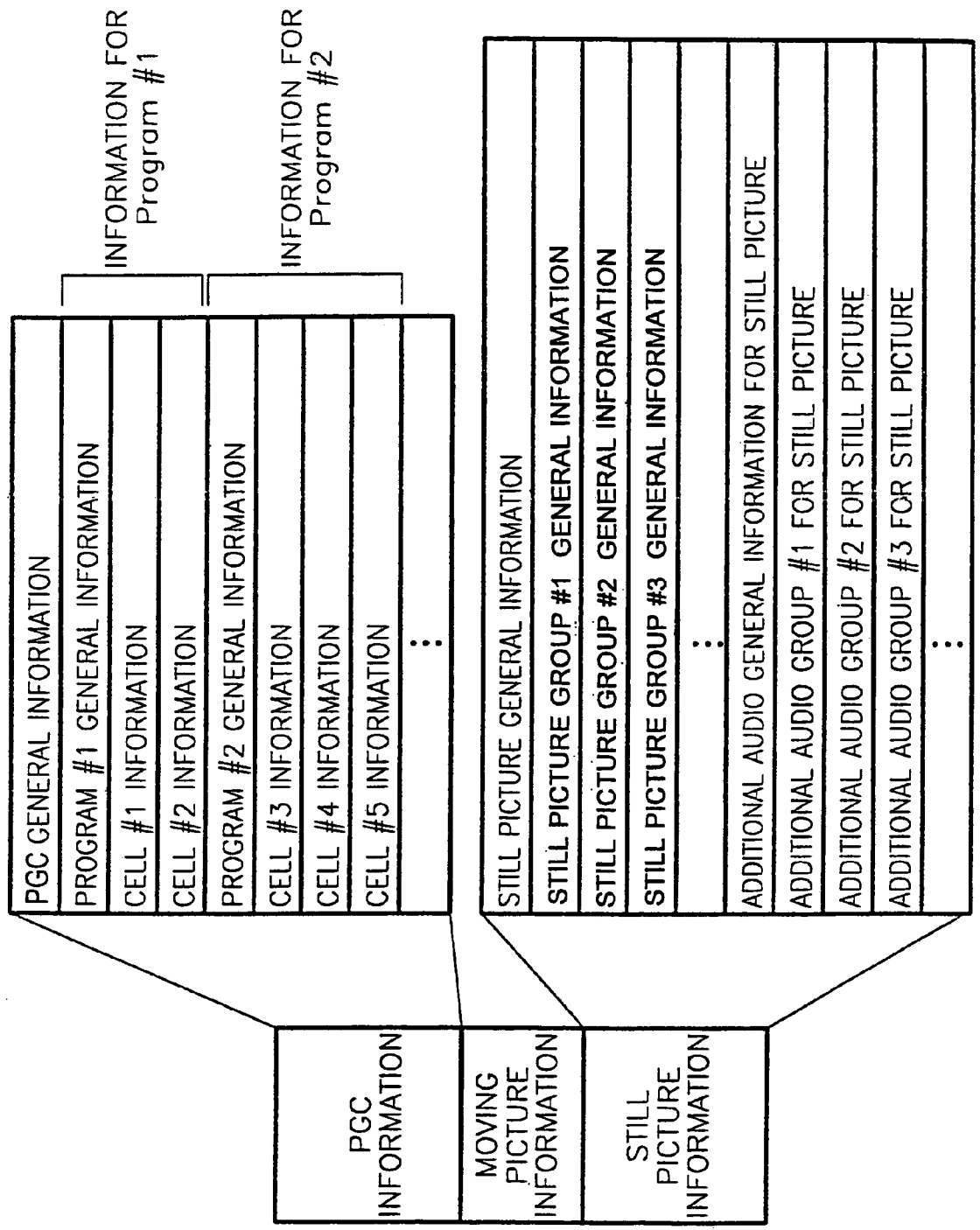
FIG. 2 shows an example of an overall information structure according to the present invention.

FIG. 2 shows an example of an overall information structure according to the present invention, in which information including PGC information, moving picture information and still picture information can be recorded in an information file or an information area.

Figure 3:
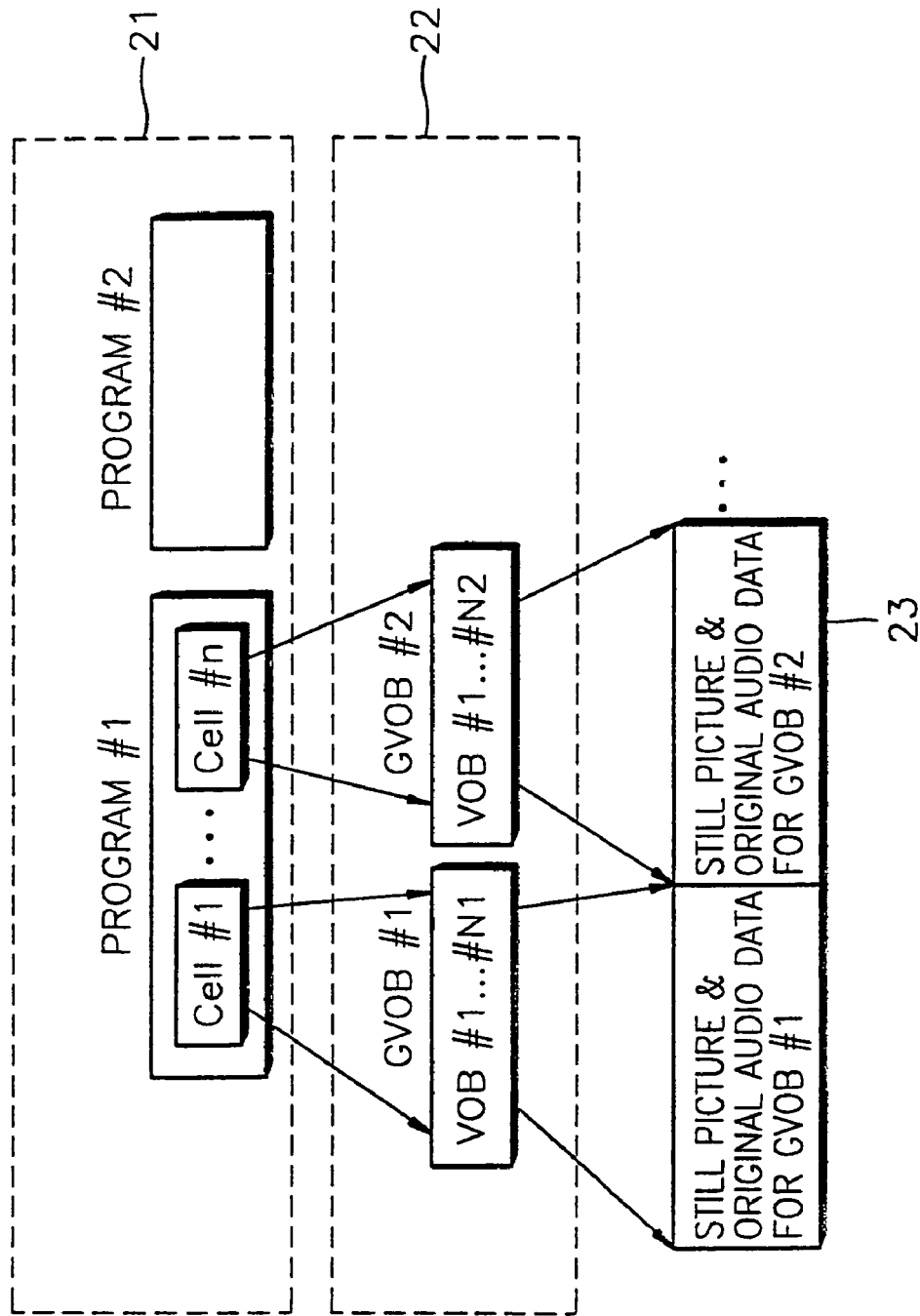
FIG. 3 shows a relationship between various kinds of information and still picture data in a still picture according to the present invention.

Here, PGC general information contains information such as the number of programs in a PGC. Program general information contains information such as the number of cells in a program. The cell information designates a VOB in the case of a moving picture, as shown in FIG. 1, and designates a still picture VOB group (to be abbreviated as "still picture group" for brevity) instead of a VOB, in the case of a still picture, as shown in FIG. 3. Since the moving picture information has already been described with reference to FIG. 1, a description thereof will be omitted herein and still picture information according to the present invention will now be described. Still picture general information contains information relating to the number of kinds of still picture group information, and additional audio general information for the still picture contains information relating to the number of kinds of additional audio group information.

FIG. 3 shows the connection structure of various kinds of information and still picture data in a still picture. In other words, in a still picture recorded in units of VOBs in a data file, a plurality of VOBs for still pictures are managed by a still picture group, and cell information contained in the PGC information 21 designates still picture group information (GVOB), rather than a single item of VOB information. Also, audio data may be recorded in addition to the still picture. The audio data is recorded consecutively after the still picture is recorded, thereby reducing the search time of a reproducing head during reproduction. The audio data recorded together with the still picture is called original audio data, which is contained in the still picture group. In the present invention, unless specifically defined, a still picture represents both one having only a video part and one having the original audio part and the video part.

By managing the still picture by grouping the same in such a manner, the amount of cell information and still picture information can be reduced. For example, video coding attributes or audio coding attributes in a still picture group are assimilated, thus forming still picture group general information, and stored as common information. For the respective still pictures, the positions thereof in the still picture data file must be indicated. In the case when the still pictures are not separated into a plurality of groups, the start positions of the respective still pictures must be indicated. However, in the case when the still pictures are grouped, the start position at which the pertinent still picture group starts to be recorded in a file is stored in the still picture group general information and then only the sizes of the respective still pictures are recorded as the information for the respective still pictures. Since the amount of information indicative of the size of still picture data, i.e., the number of bytes, is generally less than that indicative of the position in a file, the overall amount of information can be reduced.

In order to locate a recording position of a specific still picture in the still picture group, the start position of the still picture group data contained in the still picture group general information is added to the size of the data preceding the still picture to be located. Also, in order to read audio data added to a still picture, the located position of the still picture is added to the size of a video part of the still picture.

In the case of a still picture group, video parts and audio parts are consecutively recorded in a file or space. Thus, the video information and the audio information each containing the size thereof are also recorded in a bitstream order in which the video data and the audio data are actually recorded. Thus, the respective regions shown in FIG. 3 can exist in the form of a still picture file 23 to which audio data may be added, and an information file containing cell information contained in the PGC information 21 and still picture information 22. The still picture file 23 can be designated by a first region, and the information file containing the PGC information 21 and the still picture information 22 can be designated by a second region which is a logic region.

Figure 4:
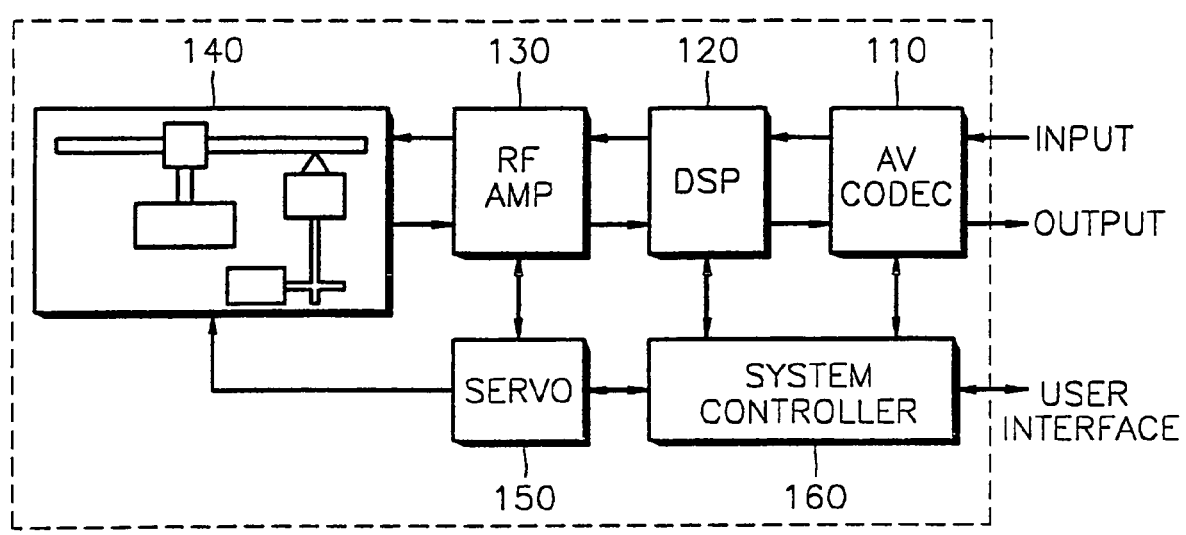
FIG. 4 is a block diagram of a recording/reproducing apparatus according to the present invention.

FIG. 4 is a block diagram of a recording/reproducing apparatus for implementing the present invention. The function of an apparatus for recording/reproducing A/V (audio/video) data using a recordable and rewriteable disk is largely divided into recording and reproduction.

During recording, an AV codec 110 compression-codes an externally applied A/V signal by a predetermined compression scheme and supplies size information for compressed data. A digital signal processor (DSP) 120 receives A/V data supplied from the AV codec 110, adds additional data for ECC (error correction code) processing thereto and performs modulation using a predetermined modulation scheme. A radio frequency amplifier (RF AMP) 130 converts electrical data supplied from the DSP 120 into an RF signal. A pickup 140 drives a disk and records the RF signal supplied from the RF AMP 130, incorporating an actuator for focusing and tracking. A servo 150 receives information necessary for servo control from a system controller 160 and stably performs a servo function. The system controller 160 controls the overall system through interfacing with a user to thus control the still picture to be recorded on the disk and record separate information for the recorded still picture. Still picture data are managed at a group level by constructing the still picture group information of the information for the respective still pictures, including size information of still picture data, size information of audio data, playback time information of audio data and the like, and the position information of the respective still pictures, in the recording order of recorded still pictures and audio data. Cell information concerning the reproduction order is recorded as well as the above-described information. The cell information contains information indicative of the recorded still picture group so that the recorded still picture and audio data can be reproduced.

During playback, the pickup 140 picks up the optical signal from the disk having data stored therein and the data is extracted from the optical signal. The RF AMP 130 converts the optical signal (that is, RF signal) into electrical data, and extracts a servo signal for performing a servo function, and modulated data. The DSP 120 demodulates modulated data supplied from the RF AMP 130 corresponding to the modulation scheme used during modulation, performs an ECC process to correct errors and eliminates added data. The servo unit 150 receives information necessary for servo control from the RF AMP 130 and the system controller 160 and stably performs a servo function. The AV codec 110 decodes the compressed AN data supplied from the DSP 120 to output an A/V signal. The system controller 160 controls the overall system for reproducing the user's desired data (still picture only, still picture+audio data or still picture+additional audio data) using the cell information and still picture group information stored on the disk while performing user interfacing such as processing of the user's key inputs.

In other words, in order to reproduce a specific still picture and audio data, the still picture group information having the still picture to be reproduced is obtained from the cell information, information such as the size of the still picture data and the information for the data size and playback time of audio data, if any, is obtained from the still picture group information, thereby reproducing only desired data. Here, the A/V codec 110, the DSP 120, the RF AMP 130 and the pickup 140 operating during recording can be referred to as a recording processor. Also, the pickup 140, the RF AMP 130, the DSP 120 and the A/V codec 110 operating during playback can be referred to a reproduction processor.

Figure 5:
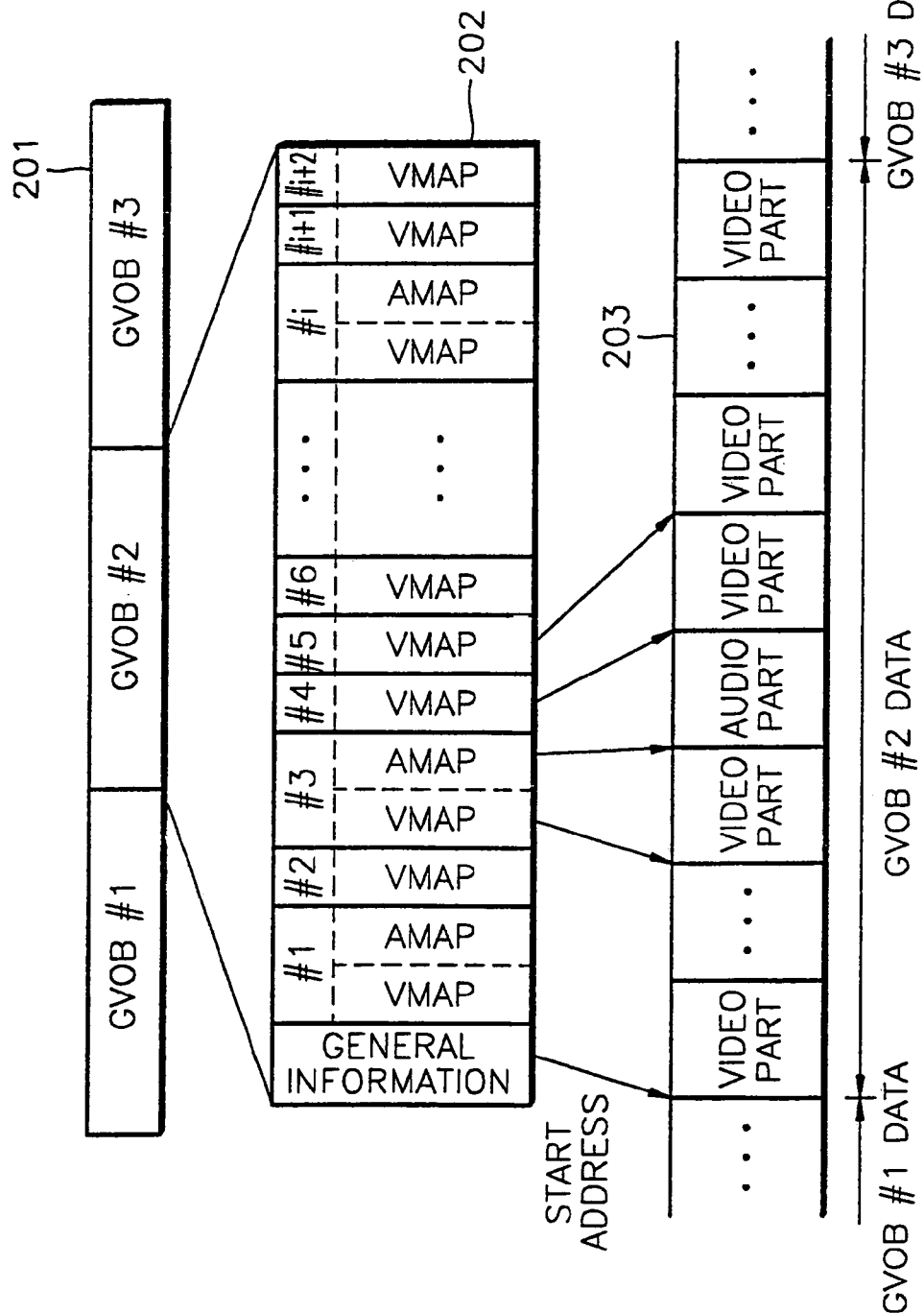
FIG. 5 shows the relationship between still picture data and still picture group information according to the present invention.

FIG. 5 shows the relationship between still picture data and still picture group information, in which the information for a plurality of still pictures (e.g., 64 maximally) having the same attributes is recorded in the respective still picture group (GVOB) information 201. The number of the still pictures forming each still picture group is determined such that it is within the limit of the maximum number of still pictures. Each still picture group information 202 includes still picture group general information and information for the respective still pictures and is information for still picture data 203 including video parts and video or audio parts in a sequence of bitstreams recorded. The still picture group general information has the start address of the corresponding still picture group.

Also, as information for the respective still pictures, still picture information having audio data exists in the form of map information including video part information for video parts and audio part information for audio parts. Here, a video map and an audio map for a still picture have the same identification information. If the still picture information includes only video parts, it exists in the form of maps having only the video part information. Here, still picture data is recorded in VOBs.

Figure 6:
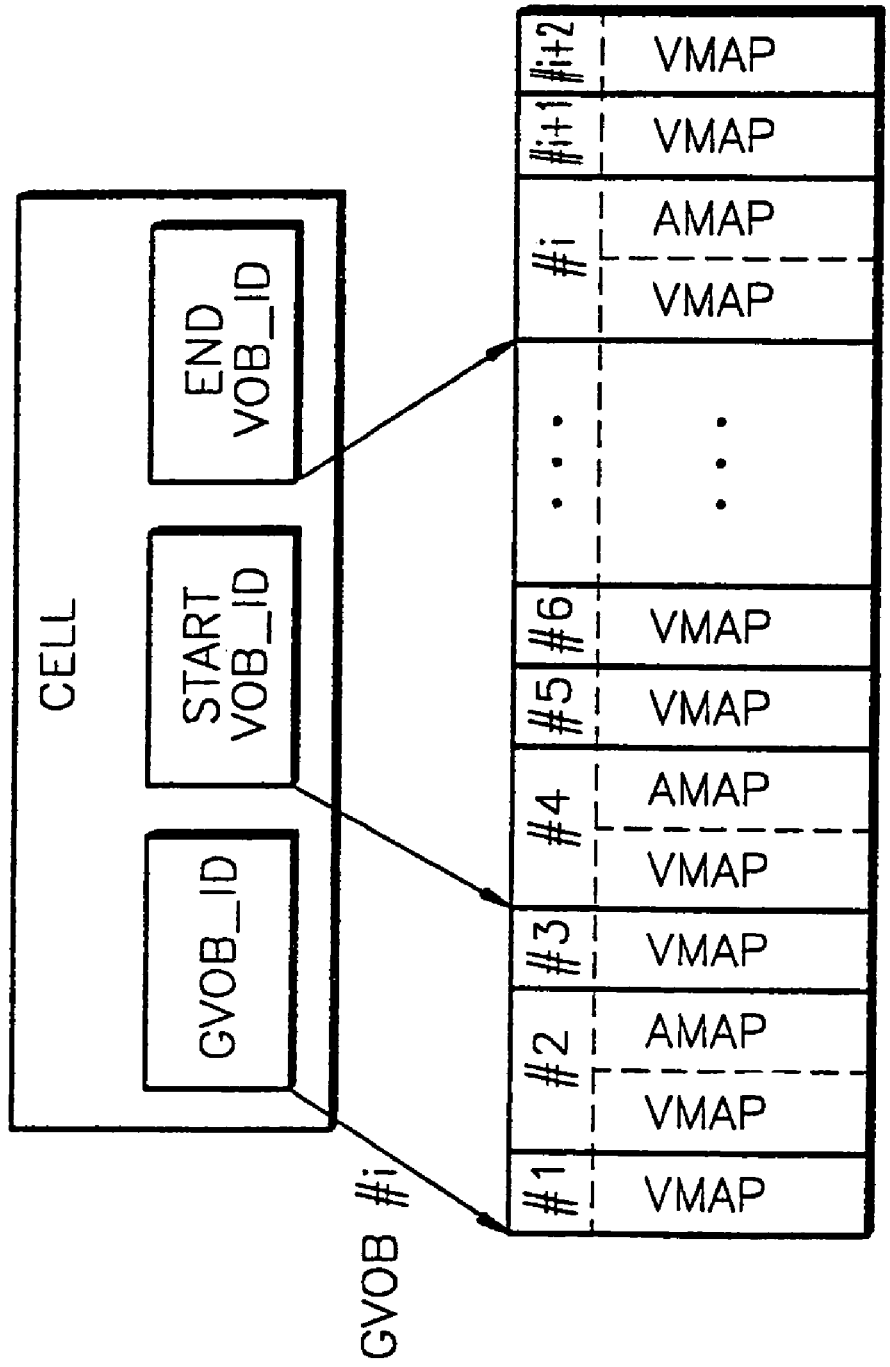
FIG. 6 shows the relationship between cell information and still picture group information.

FIG. 6 shows the relationship between cell information (which can also be referred to as playback information ) and still picture group information, in which a cell is a logical unit in relation to indication of a reproduction order. The cell information includes still picture group identification information (GVOB_ID), still picture reproduction start identification information (START VOB_ID) of the corresponding still picture group and still picture reproduction ending identification information (END VOB_ID). The cell information may correspond to all the still picture groups or may correspond to only some of the still picture groups which are intended to be reproduced.

Figures 7, 8:
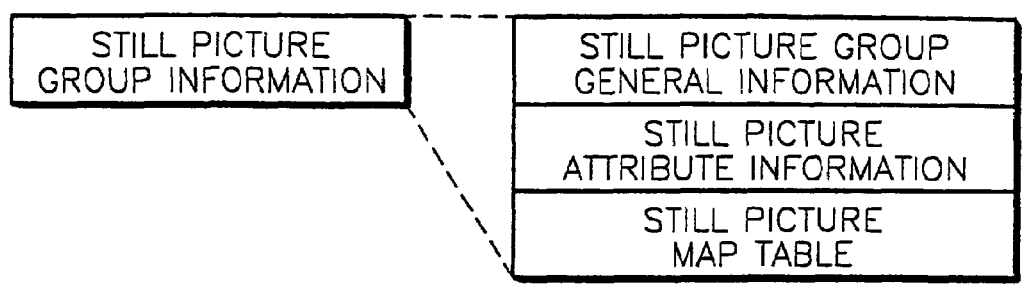
FIG. 7 illustrates the structure of still picture group information according to the present invention.
FIG. 8 is a table showing an example of the detailed contents of the still picture group general information shown in FIG. 7.

FIG. 7 illustrates the structure of still picture group information according to the present invention, which includes still picture group general information and a still picture map table, and may further include attribute information for a still picture such as picture sizes or video encoding modes.

FIG. 8 is a table showing an example of the detailed contents of still picture group general information shown in FIG. 7, which includes GVOB_ID representing information for identifying a still picture group in a still picture file, GVOB- _S_ADR representing the start address of first still picture data in the corresponding still picture group in the still picture file, GVOB_Ns representing the number of still pictures in the still picture group, and so on. Here, the identification information GVOB_ID can be expressly recorded as a unique one for each still picture group in a still picture file or can be suggestively indicated in the order of still picture groups, that is, #1, #2, . . . .

Figures 9, 10, 11:
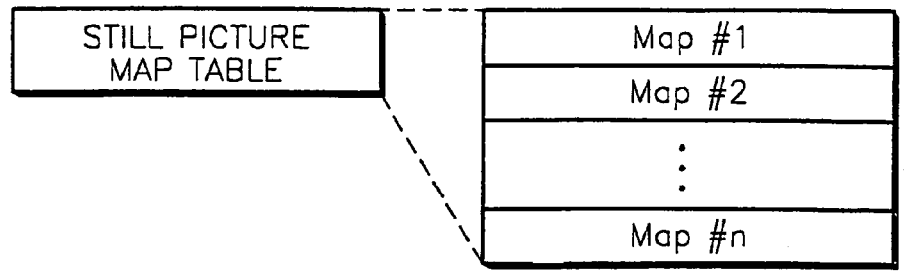
FIG. 9 illustrates the structure of a still picture map table shown in FIG. 7.
FIG. 10 is a table showing an example of the detailed contents of a video map in the map table shown in FIG. 9.
FIG. 11 is a table showing an example of the detailed contents of an audio map connected to the video map shown in FIG. 10.

FIG. 9 illustrates the structure of the still picture map table shown in FIG. 7. There are two types of maps; one is video maps VMAPs for video parts and the other is audio maps AMAPs for audio parts added to corresponding still pictures. The order of maps is the same as that of data of recorded bitstreams in a still picture file as shown in FIG. 5. Thus, in the case when a still picture has only a video part, there is only a video map. In the case when a still picture has audio data in addition to the video part, both a video map and an audio map are recorded and are practically considered as one map using the same identification information.

FIG. 10 is a table showing an example of the detailed contents of a video map in the map table shown in FIG. 9, containing MAP_TY indicating the type of a corresponding map and represented by a binary "0" in the case of a video map for a video part, VOB_ID indicating identification information for the video part and ranging from 1 to 64 in preferred embodiments. Also, VOB_ID can be expressly indicated or suggestively indicated in the recording order, that is, #1, #2, #3, . . . .

Also, the video map contains V_PART_SZ indicating the size of the video part. Here, VOB_ID and V_PART_SZ can be referred to as still picture position information.

FIG. 11 is a table showing an example of the detailed contents of an audio map, containing MAP_TY indicating the type of a corresponding map and represented by a binary value "1" in the case of an audio map for an audio part, A_PBTM indicating the playback time of the audio part and A_PART_SZ indicating the size of the audio part.

FIG. 12 is a table showing an example of the detailed contents of cell information for a still picture, shown in FIG. 7, containing S_GVOB_ID indicating identification information for a still picture group, S_VOB_ID indicating identification information for a still picture in which reproduction starts, and E_VOB_ID indicating identification information for a still picture in which reproduction ends.

Figure 13A:
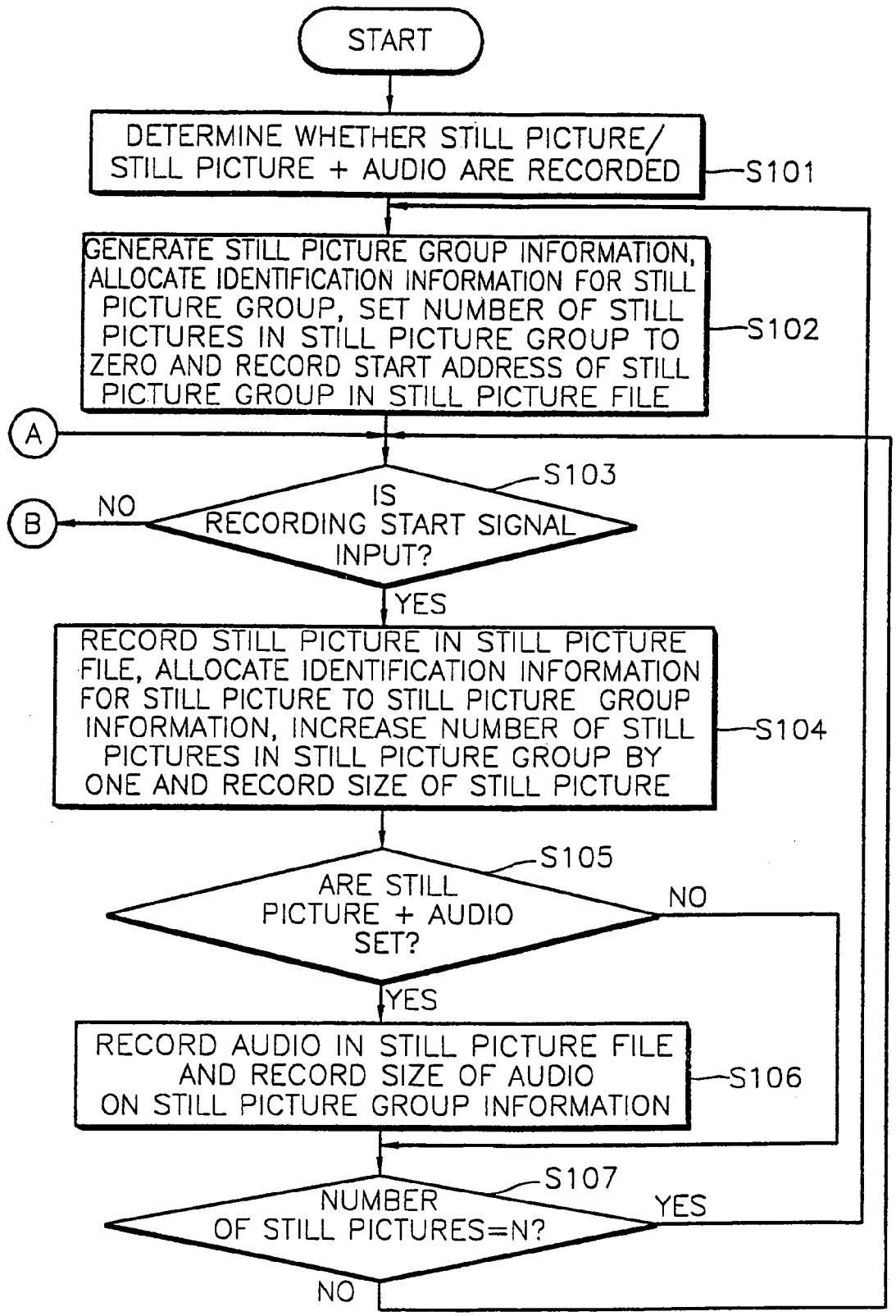
FIGS. 13A and 13B illustrate a flow chart showing a method for recording a still picture according to an embodiment of a present invention.
Figure 13B:
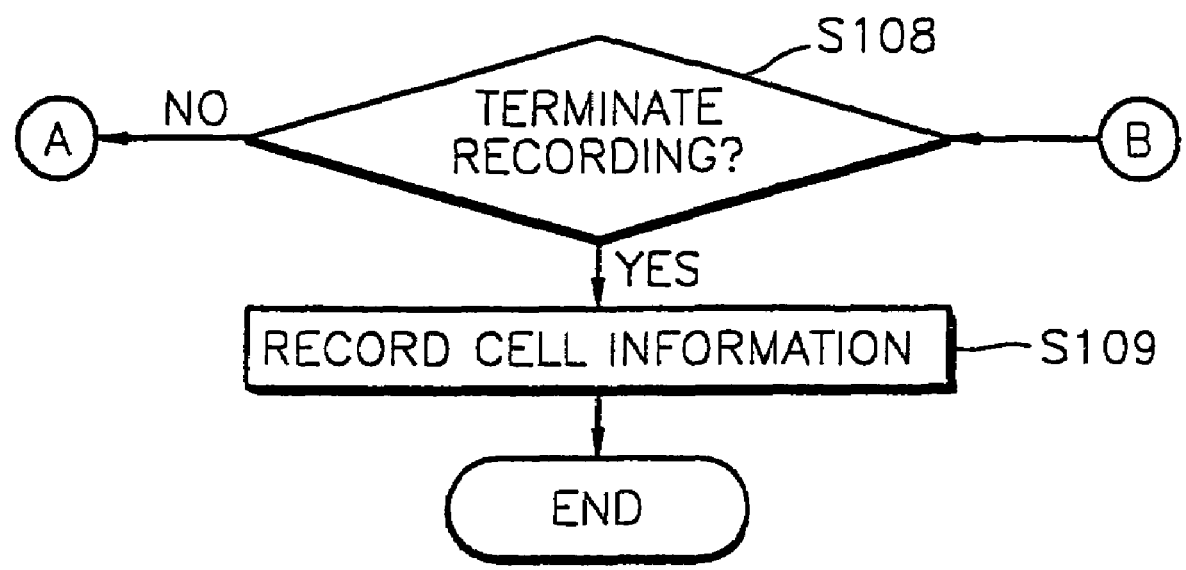

FIGS. 13A and 13B illustrate a flow chart showing a method for recording a still picture according to an embodiment of the present invention, that is, a method for recording a still picture and audio data. First, it is determined whether a still picture or both a still picture and audio data is recorded (step S101). Still picture group information is generated, identification for a still picture group is allocated, the number of still pictures in the still picture group is set to "0" and the start address of the still picture group in a still picture file is recorded (step S102). It is then determined whether a recording start signal of a still picture is input by a user or not (step S103). If the recording start signal is input, the still picture is recorded in the still picture file, identification information for the still picture is allocated to the still picture group information, the number of still pictures in the still picture group is increased by one and the size information of the still pictures is recorded in the video map (step S104).

It is determined whether or not a mode set by a user is for recording both a still picture and audio data (step S105). If yes, the audio data for the still picture is recorded following after the corresponding still picture on the still picture file and the audio size information is recorded in an audio map in the still picture group information (step S106).

It is determined whether the number of still pictures recorded exceeds a maximum number possible to constitute the information for a still picture group (e.g., 64 maximally) (step S107). If the still picture group information is completed, the procedure returns to step S102 to generate another still picture group information. Otherwise, the procedure proceeds to step S103 to determine whether a recording start signal of a still picture is input by a user or not.

If the mode set by a user is for recording only a still picture in step S105, step S106 is skipped and the procedure proceeds to step 107 to record the next still picture. If the recording start signal of a still picture is not input by a user in step S103, it is determined whether or not to terminate recording (step S108). If it is determined to terminate recording, cell information is recorded and the procedure ends (step S109). Here, the cell information is created for every still picture group so as for all still pictures to be reproduced.

Figure 14:
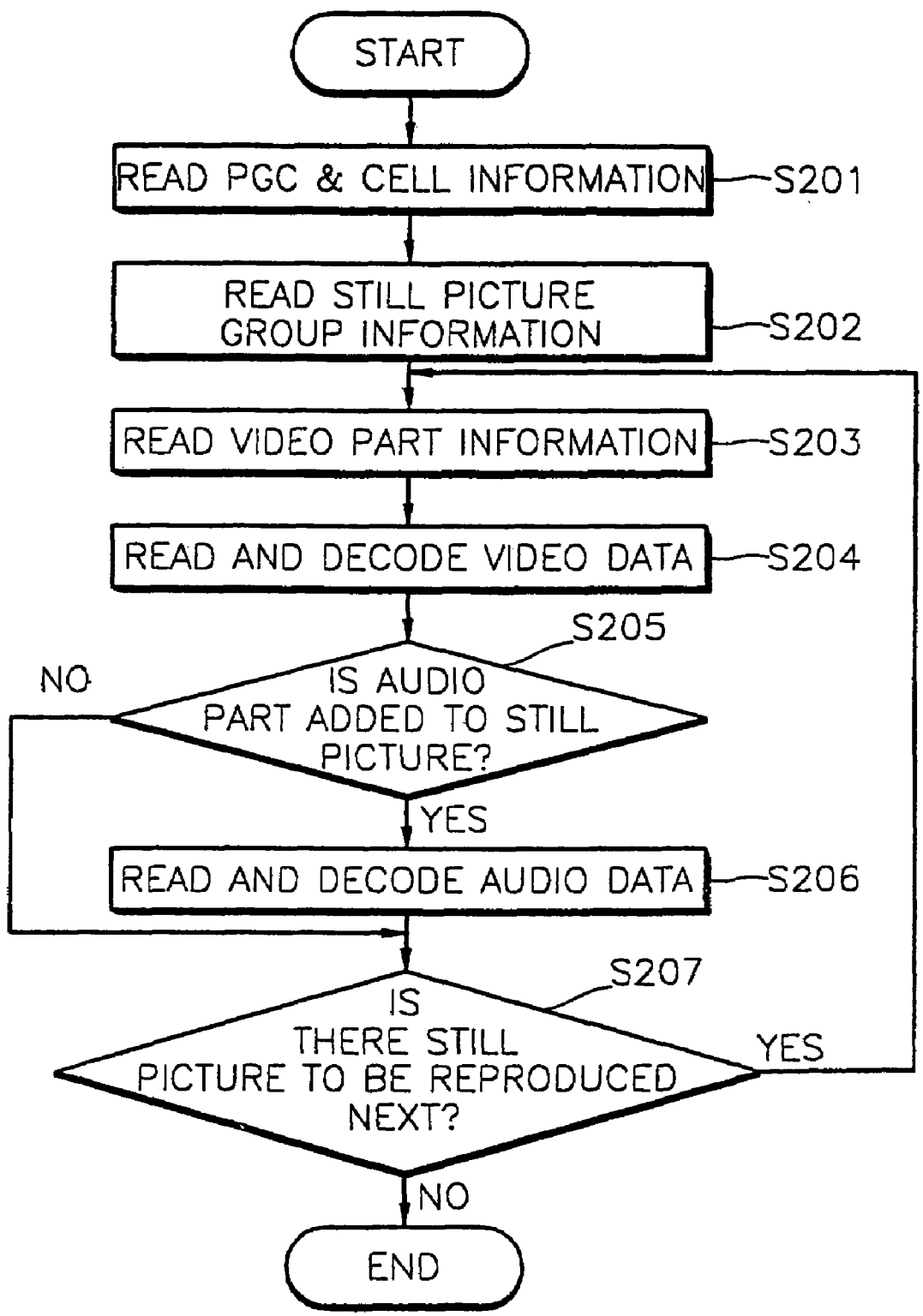
FIG. 14 is a flow chart showing a method for reproducing a still picture according to the embodiment of the present invention.

FIG. 14 is a flow chart showing a method for reproducing a still picture according to an embodiment of the present invention, that is, a method for reproducing a still picture and audio data added thereto. Referring to FIG. 14, PGC information and cell information are read (step S201). Identification information for a still picture group to be reproduced, playback start identification information and playback ending identification information are read from the cell information to read the still picture group information pointed to by the cell (step S202). Video map information for the video part corresponding to the playback start identification information in the read still picture group information is obtained to read the size of a video part, or both video map information and audio map information are obtained in the case of a still picture having audio data to read the size of a video part and the size of an audio part (step S203).

The position of a desired still picture is calculated by the read video part information and video data located at the calculated position is read and decoded to reproduce the still picture (step S204). Here, the position of a desired still picture is obtained by summing the start position of a still picture group and the size of data preceding the desired still picture. While the still picture is reproduced, it is determined whether audio data is added to the still picture (step S205). If yes, the audio data is read and decoded to reproduce the audio data (step S206). Here, the reading position of the audio data is obtained by summing the calculated position of the still picture and the size of a video part of the still picture. It is checked whether all still pictures belonging to a cell are reproduced or not using the cell information and then it is determined whether or not there is a still picture to be reproduced next (step S207). If yes, the information for the video part of the still picture to be reproduced next is read (step S203). Otherwise, the procedure is terminated. In the case when there are a plurality of series of cell information, this routine is repeated.

Here, the step of determining whether audio data is added to a still picture (step S205) may be performed directly after the step of reading the still picture group information (step S202). This is because it is possible to determine that audio data is added to a still picture in the case when an audio map for an audio part is added subsequently to a video map for a video part, in accordance with the still picture group information.

Before reproduction, a reproduction mode may be set through a user interface to determine whether only a still picture is to be reproduced, or both a still picture and audio data are to be reproduced.

As described above, according to the present invention, a plurality of still pictures and audio data added thereto can be recorded and/or reproduced using minimum information by storing still picture group information for separating the plurality of still pictures and audio data into within a predetermined maximum number of groups in order to manage the still pictures at a group level.

Also, according to the present invention, since the still picture group information includes still picture group general information as the common information in the recording order of bitstreams of still pictures and audio data added thereto, and video part information and audio part information are constructed for each still picture in the still picture group, effective management of information can be performed.

What is claimed is:

1. An apparatus for recording and/or reproducing audio and/or video data on a writeable and/or rewriteable recording medium, comprising:

a recording processor to signal-process at least one still picture to be recorded in a first region of the recording medium; and a controller to generate still picture group information for arranging still pictures in the first region into at least one still picture group so as to manage still pictures at a group level, and to control the generated still picture group information to be recorded in a second region of the recording medium, wherein the still picture group information includes still picture group general information containing start position information of the one still picture group and information relating to a number of video parts in the one still picture group, and information for each still picture in the one still picture group containing position information thereof, and the position information for the still pictures includes size information of video parts of still pictures.

2. The apparatus according to claim 1, wherein the number of still pictures in a group is 64.

3. An apparatus for recording and/or reproducing audio and/or video data on a writeable and/or rewriteable recording medium, comprising:

a recording processor to signal-process at least one still picture and at least one audio data related to the one still picture to be recorded in a first region of the recording medium; and a controller to generate still picture group information for arranging still pictures in the first region into at least one still picture group so as to manage still pictures at a group level, and to control the generated still picture group information to be recorded in a second region of the recording medium, wherein the still picture group information includes position information for still pictures, including size information of video parts of still pictures and size information of audio parts for audio data corresponding to still pictures.

4. An apparatus for reproducing still pictures from a recording medium including a first region having at least one still picture and a second region having a least one still picture group information for arranging still picture data in the first region into at least one still picture group so as to manage still pictures at a group level, comprising:

an optical pickup to read the one still picture group information; and a playback processor to determine a start address of a still picture in the first region based upon the read at least one still picture group information, wherein the at least one still picture group information includes still picture group general information containing start position information of the at least one still picture group and information relating to a number of video parts in the at least one still picture group, and information for each still picture in the at least one still picture group containing position information thereof, and the position information for the still pictures includes size information of video parts of still pictures.

5. The apparatus according to claim 4, wherein the number of still pictures in a group is 64.

6. An apparatus for reproducing still pictures from a recording medium including a first region having at least one still picture and a second region having at least one still picture group information for arranging still picture data and at least one audio data related to a still picture in the first region into at least one group so as to manage still pictures at a group level, comprising:

an optical pickup to read the one still picture group information; and a playback processor to determine a start address of a still picture based upon the read one still picture group information, wherein the one still picture group information includes position information for still pictures, including size information of video parts of still pictures and size information of audio parts of still pictures.

7. The apparatus according to claim 6, wherein the position information further comprises playback time information of audio data.

* * * * *

UNITED STATES PATENT AND TRADEMARK OFFICE
CERTIFICATE OF CORRECTION

PATENT NO. : 7,444,066 B2 Page 1 of 1
APPLICATION NO. : 10/712320
DATED : October 28, 2008
INVENTOR(S) : Seong-jin Moon et al.

It is certified that error appears in the above-identified patent and that said Letters Patent is hereby corrected as shown below:

Column 10, line 20, delete "at least".

Signed and Sealed this

Sixteenth Day of December, 2008

JON W. DUDAS
*Director of the United States Patent and Trademark Office*